April 3, 1934.                A. FRANKE                    1,953,218
DRIVING DEVICE FOR THE CHARGING SLIDE IN FRICTION WHEEL SPINDLE PRESSES
                        Filed July 19, 1932
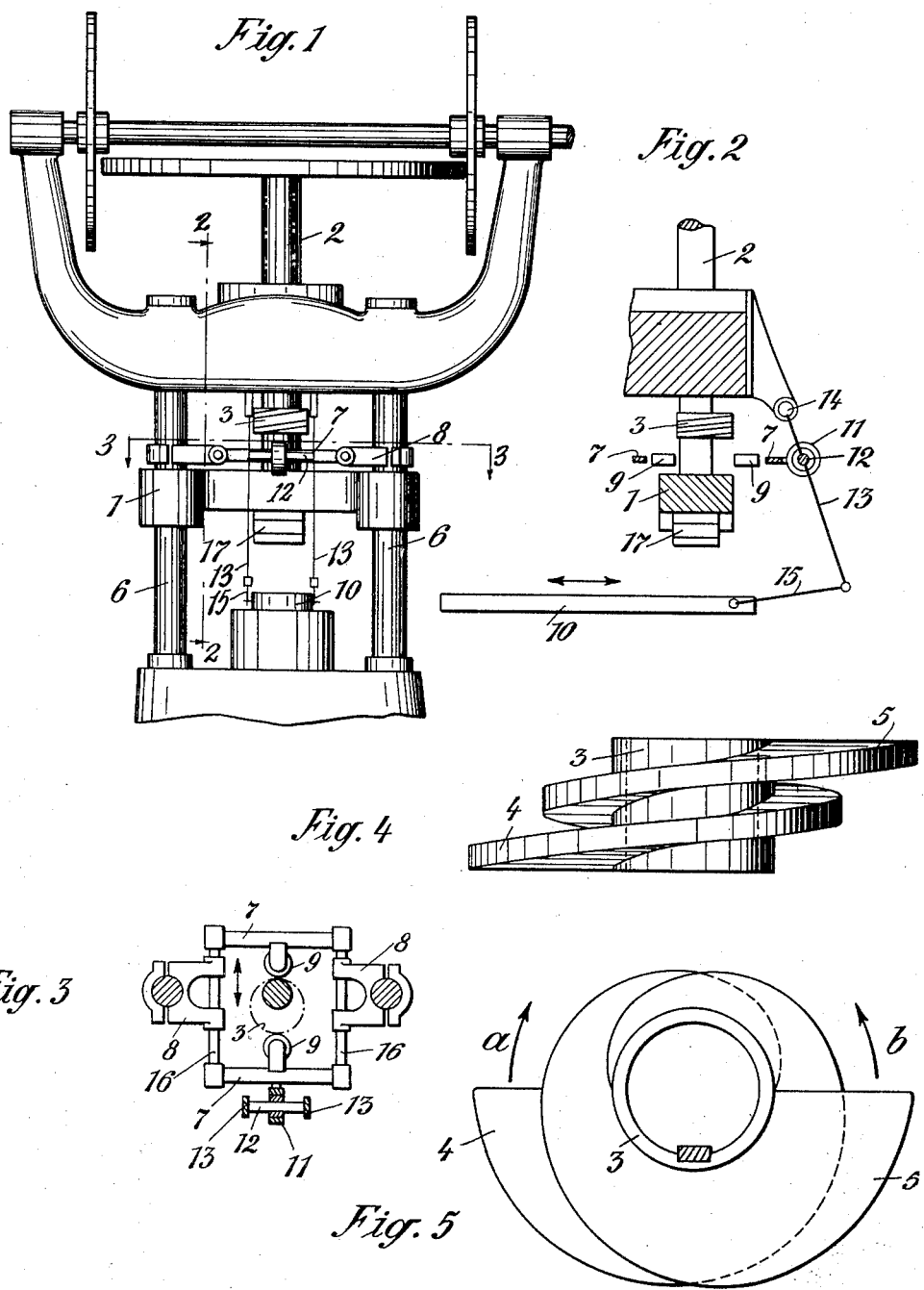
Inventor:
Alfred Franke Patented Apr. 3, 1934

1,953,218

UNITED STATES PATENT OFFICE 1,953,218

DRIVING DEVICE FOR THE CHARGING SLIDE IN FRICTION WHEEL SPINDLE PRESSES

Alfred Franke, Oberlind-Sonneberg, Germany, assignor to Maschinenfabrik vorm. Georg Dorst A. G., Oberlind-Sonneberg, Germany Application July 19, 1932, Serial No. 623,384
In Germany July 30, 1931

1 Claim. (Cl. 25—85)

The invention relates to a friction wheel spindle press which is intended to press slabs for covering floors and walls from ceramic material. In presses of this type the ceramic material is fed to the ram of the press by a reciprocating charging slide. The invention relates particularly to the device for actuating this slide which is operated by the up and down movement of the press spindle.

In known presses movements of the spindle and of the charging slide are derived both from the longitudinal and also from the rotary movement of the spindle carrying the ram. In the known arrangements, the spindles and the charging slides are permanently inter-connected. This is open to the objection of a considerable consumption of power and unfavourable stressing of the press, as, at the beginning of the ram movement, the weight of the relatively heavy slide and of the connecting parts must be accelerated, together with the friction wheel gear, and at the end of the ram stroke, when the power requirements for producing the pressing pressure is particularly great, the movement of these parts consumes considerable power.

According to the invention the arrangement is such that the spindle is completely relieved from the slide at the commencement and end of its movement. This is attained in that the shifting device for the charging slide mounted on the vertically reciprocable spindle is only periodically connected therewith. For this purpose, a cam fitted on the spindle and provided with two spiral-shaped widening screw threads may serve, which, during the up and down movement of the spindle, screws through the aperture of a shiftable frame connected to the slide. Owing to its eccentric shape, the spindle shifts the frame in one or other direction during its passage therethrough, but before passing therethrough, all connection between the spindle and the slide is disengaged.

An embodiment of the invention is illustrated by way of example in the accompanying drawing, in which:—

Fig. 1 shows the spindle press in front elevation.

Fig. 2 is part section on line 2—2 of Fig. 1 and shows the drive of the charging slide.

Fig. 3 is a section on line 3—3 of Fig. 1 and shows the shiftable frame in top plan view.

Fig. 4 is a side elevation of the cam with two screw threads.

Fig. 5 is a top plan view of Fig. 4.

Above the cross head 1 carrying the ram 17, a cam 3 is keyed on a spindle 2, which cam has two spiral shaped widening screw threads 4 and 5. A frame 7, shiftable from the front towards the rear, is mounted between the uprights 6 of the machine on which the cross head 1 moves up and down. The frame 7 is carried by slide bearings 8 which are bolted on the uprights, and in which the side bars 16 of the frame 7 slide. On the inner side of the rear and front transverse bars of the frame, rollers 9 are mounted. The cam 3 screws its way into the space between these rollers during the descent of the spindle, and, owing to its spiral shape, shifts the frame until it has passed between the rollers, whereupon the frame comes to a standstill. After the pressing of the plate, the same operation takes place, but in inverse sense, during the ascent of the spindle. The frame is thus shifted in the opposite direction by the second screw thread of the cam.

In order to transmit the movement of the frame 7 to the charging slide 10, a bearing 11 is arranged on the front transverse element of the frame, which bearing carries a transverse rod 12. This rod connects two rocking bars 13 (Figs. 2 and 3), which are oscillatable on pins 14 and the lower ends of which are connected by connecting rods 15 to the charging slide.

During the ascending movement of the spindle, this cam 3 rotates in the direction of the arrow $a$ (Fig. 5) and pulls back the slide. During the descending movement of the spindle, the cam rotates in the direction of the arrow $b$ and imparts to the slide the necessary forward movement required for ejecting the pressed plates.

I claim:—

On a friction wheel spindle press for pressing slabs from ceramic material, a device for actuating the slide feeding the mass, comprising in combination with the press frame and the press spindle, a cam arranged on said spindle and having spiral shaped screw threads, a reciprocatable frame having an aperture adapted to allow the passage of said spiral shaped screw threads to periodically influence said reciprocatable frame, and a rod system hingedly mounted on said machine frame and hingedly connected to said charging slide and said reciprocatable frame adapted to impart a reciprocating movement to said slide.

ALFRED FRANKE.